United States Patent [19]

Russell

[11] Patent Number: 4,713,800
[45] Date of Patent: Dec. 15, 1987

[54] SEISMIC AIR GUN

[75] Inventor: Michael J. Russell, Frogham, United Kingdom

[73] Assignee: Geotech Engineering, Ringwood, United Kingdom

[21] Appl. No.: 628,453

[22] Filed: Jul. 9, 1984

[30] Foreign Application Priority Data

Jul. 18, 1983 [GB] United Kingdom ................. 8319390

[51] Int. Cl.[4] .............................................. G01V 1/02
[52] U.S. Cl. .................... 367/144; 181/118; 181/120; 181/402
[58] Field of Search .......................... 181/116–120, 181/402; 367/144

[56] References Cited

U.S. PATENT DOCUMENTS

| 4,141,431 | 2/1979 | Baird | 181/118 |
| 4,234,052 | 11/1980 | Chelminski | 181/120 |
| 4,240,518 | 12/1980 | Chelminski | 181/120 |
| 4,246,979 | 1/1981 | Thomson et al. | 181/120 |
| 4,271,924 | 6/1981 | Chelminski | 181/120 |
| 4,301,887 | 11/1981 | Fiske, Jr. | 181/120 X |
| 4,402,382 | 9/1983 | Mollere | 181/120 |

FOREIGN PATENT DOCUMENTS

| 1090363 | 11/1967 | United Kingdom . |
| 1552389 | 9/1979 | United Kingdom . |
| 2023829 | 1/1980 | United Kingdom . |

Primary Examiner—Deborah L. Kyle
Assistant Examiner—John E. Griffiths
Attorney, Agent, or Firm—Mattern, Ware, Stoltz & Fressola

[57] ABSTRACT

A seismic air gun has a passage between the stem of its shuttle and a baffle, whereby ambient pressure can reach the back of the operating piston. The gun is fired by dumping a small quantity of pressure air from the operating chamber via a solenoid valve to the ambient surroundings. The firing seal is a lip seal. The shuttle is of unitary construction, while the baffle is diametrically split.

19 Claims, 4 Drawing Figures

SEISMIC AIR GUN

BACKGROUND OF THE INVENTION

The present invention relates to an air gun of the type which can release pressurized gas with explosive suddenness for use in, for example, seismic surveying, particularly though not exclusively at sea.

As used herein the term "seismic air gun" means such a gun comprising:

a body;

a firing chamber within the body for containing pressurized gas to be released on firing of the gun;

an operating chamber within the body also for containing pressurized gas; and a shuttle movably accommodated in the body having two pistons inter-connected by a stem, the stem having a throttled bore for communicating pressure from one end of the shuttle to the other;

a firing seal at the firing chamber co-operating with a firing one of the pistons to close the firing chamber when the shuttle is in a firing position, and an operating seal at the operating chamber co-operating with an operating one of the pistons to close the operating chamber when the shuttle is in a position for firing, the operating seal sealing a greater area of the operating piston to the body than the area of the firing piston sealed to the body for maintaining the pressure of pressurized gas in the operating chamber acting on the operating piston with a force greater than that of the pressure of the pressurized gas acting on the firing piston, whereby the shuttle is held in its firing position.

Normally, the body will comprise a plurality of parts secured together.

It should, however, be noted that the above seismic air gun components may be incorporated in a gun or other apparatus still within the definition but intended for other uses. For example guns in accordance with this invention may be used in air operated pile drivers, mining face impact tools, stamping tools and road impaction hammers. Similarly pressurized gases other than air may be used.

As soon as the biassed balance of the pressure forces acting on the two pistons of the shuttle is disturbed from a bias towards the firing position to a bias away from this position, the gun fires and the pressurized gas is released from the firing chamber.

An early description of such a gun is in British Patent Specification No. 1,090,363, in particular in FIGS. 4 and 9. This gun is fired by bleeding pressurized gas from the operating chamber to the side of the operating piston opposite from the operating chamber. A partition seal with the shuttle stem retains a build up of pressure on the opposite side of the operating piston, and the pressure balance on the shuttle is disturbed. Once the pressure balance has been changed sufficiently to move the shuttle, the operating seal is opened allowing a sudden increase in pressure behind the operating piston. This results in a sudden acceleration of the shuttle due to the pressure of the firing chamber gas and to firing of the gun.

Following the invention of British Patent Specification No. 1,090,363, seismic air guns have been widely used and conventionally are fired by the mentioned bleeding to the opposite side of the operating piston. A more recent example is that of British Patent No. 2,023,829. This conventional mode of disturbing the pressure balance is susceptible to unreliability. In this context it should be remembered that seismic air guns are normally fired every few seconds for days on end. Generally they are towed behind survey ships which are very expensive to operate. Thus a delay of even a short time to replace an unreliable gun can be very expensive.

Unreliability is usually caused by leakage past seals. For instance, leakage of pressurized gas through a solenoid valve for controllably bleeding gas to the opposite side of the operating piston can cause misfiring. In the extreme, such leakage can cause continuous cycling of the gun which fires automatically, recharges and fires again in a fault known as auto-firing.

Leakage past the operating seal itself can also cause auto-firing. There are other seals which can leak, for instance, it is conventional for the operating piston to be a separate unit secured to the stem of the shuttle with an incorporated seal. Some seismic air guns have many seals for instance the seismic air gun described in U.S. Pat. No. 4,271,924 has seven seals associated with its operating chamber, not counting those incorporated in its firing solenoid valve.

Apart from the operating seal, another important seal which is between moving parts is the partition seal which seals a partition to the stem interconnecting the shuttle pistons, the partition extending across the body of the gun transverse to the stem, which passes through the partition. If the partition seal is worn there may be an insufficient build-up of pressure on the opposite side of the operating piston for the gun to fire at all when the firing solenoid valve is actuated. Erratic sealing of this partition seal or any seal involved with the transfer of air across the operating piston for the purpose of firing the gun, will cause a variation in firing time lag. If excessive the gun will be rendered useless in a synchronised array.

It is an object of this invention to provide a simpler seismic air gun firing by a simpler method.

SUMMARY OF THE INVENTION

According to a first aspect of the invention there is provided a seismic air gun of the type hereinbefore defined, including passage means for communicating ambient pressure from outside the body to the sides of both the operating seal and at least a portion of the operating piston opposite from the operating chamber or at least for allowing escape to the ambient surroundings of any pressurized gas from the operating chamber present at the said portion of the opposite side of the operating piston, the arrangement being such that in use on firing of the gun by dumping pressurized gas from the operating chamber to the ambient surroundings at least substantially ambient pressure acts on the said portion of the operating piston at least until the shuttle moves.

According to a second aspect of the invention, there is provided a seismic air gun of the first aspect in combination with a solenoid valve adapted and arranged for dumping gas from the operating chamber to the ambient surroundings.

According to a third aspect of the invention there is provided a method of firing a seismic air gun of the first aspect consisting in the steps of:

charging the operating chamber with pressurized gas, allowing the shuttle to move to its firing position with the firing piston sealing on the firing seal and the operating piston sealing on the operating seal, allowing the firing chamber to become charged with pressurized gas via the throttled bore in the stem, and firing the gun by dumping pressurized gas from the operating chamber to the ambient surroundings whereby the pressure force on the firing piston overcomes the pressure force on the operating piston to move the shuttle to its release position.

It will be appreciated that a small leak of pressure through a firing solenoid valve, or equivalent firing means, or past the operating seal should not cause a build-up of pressure on the opposite side of the operating piston such as to unintentionally fire the gun.

Since pressure does not have to be led to the opposite side of the operating piston for firing, in contrast to the prior seismic air guns, the stem passes through the partition without sealing and the said passage means is provided. In one embodiment described herein below a bearing is provided for the stem at the partition. However in preferred embodiments, a mere baffle is provided. The baffle has clearance with the shuttle stem providing the passage means and yet acts as a baffle to pressurized gas moving to the opposite side of the operating piston on firing. Conveniently, the operating seal is carried on the baffle. In a preferred construction of the baffle it is a diametrally split metallic disc supporting a one piece seal ring, the ring in turn supporting an O-ring seal constituting the operating seal.

In prior seismic air guns wear sleeves have normally been provided in the operating chamber and between the partition and the firing chamber, in the region of pressurized gas ports, for guiding the shuttle, see for instance U.S. Pat. No. 4,271,924. Periodically these sleeves required replacement when worn. They were critical in guiding the shuttle accurately to ensure that the partition seal operated effectively. Without the requirement for the partition seal, one or other wear sleeve may be replaced by the mentioned bearing at the partition. Alternatively, as is preferred, the shuttle may be made of relatively softer material than the body of the gun whereby the shuttle wears in preference to the body of the gun. This possibility is enhanced by there being no requirement for the stem to be of sufficiently high quality finish for a partition seal.

A resultant possibility is for the shuttle to be of unitary construction, of light alloy or plastics material. The diametrally splitting of the baffle provides a convenient means of assembling such a shuttle into the gun. The unitary shuttle when of light material accelerates fast, with consequent rapid firing.

Prior seismic air guns, as for instance described in British Patent Specifications Nos. 1,090,363 and 1,552,389, reliable.

In accordance with an important subsidiary feature of the invention, the firing seal preferably includes a movable member sealed at an outer diameter to the body and at a smaller diameter to an end face of the firing piston, the differential pressure caused by the differential seal diameter maintaining the seal to the piston prior to firing.

Such a free floating firing seal may be metallic and provided with O-ring or other similar types of sealing elements; alternatively it may be of solid material adapted to seal against metal. The floating seal may be arranged to act as a damper for the final movement of the shuttle to its sealing/firing position. Whilst the floating seal is held in its sealing position by differential pressure forces on it, it may be urged into its sealing position by dynamic pressure forces during charging of the firing chamber.

Alternatively, the firing seal may be of flexible material and present a taper into which the nose of the firing piston engages.

In accordance with another important subsidiary feature, the seismic air gun preferably includes secondary ports for exhausting water from around the stem, which water is trapped between the firing piston and the baffle on firing of the gun.

Preferably the ports are so positioned with respect to the firing piston as to be progressively closed by the firing piston as the shuttle approaches the end of its firing stroke.

To help understanding of the invention, three specific embodiments thereof will now be described with reference to the accompanying drawings.

FIRST EMBODIMENT

Figure 1:
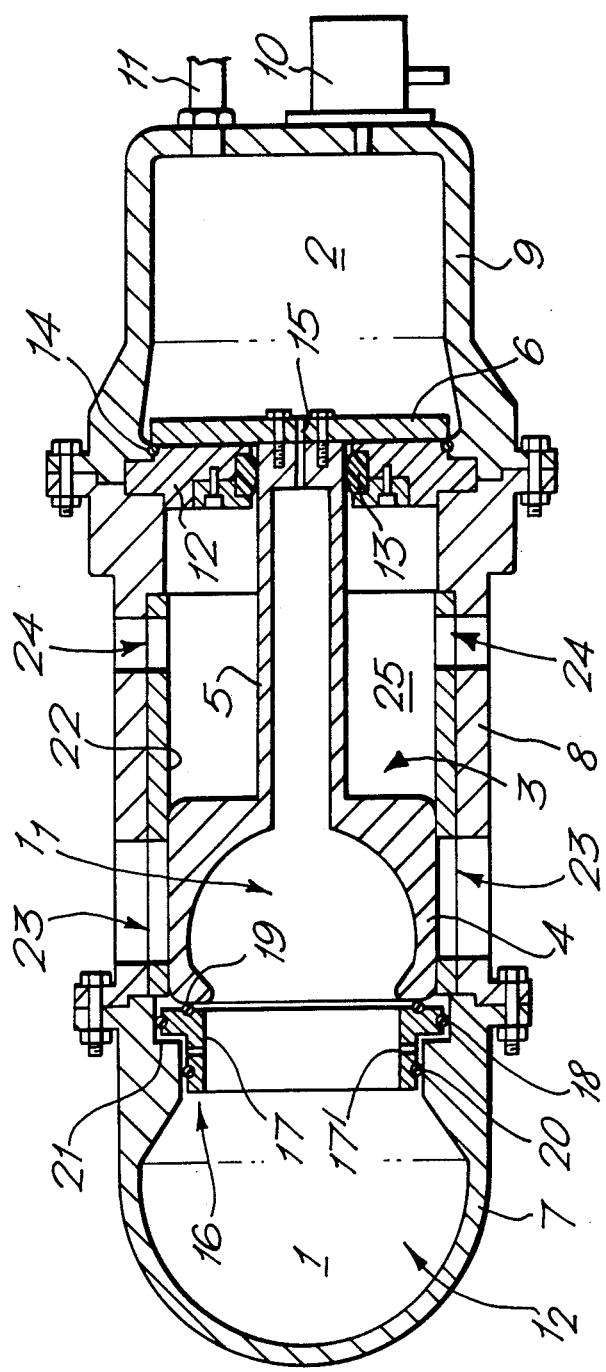
FIG. 1 is a transverse longitudinal cross-sectional view of a first seismic air gun of the invention.

Referring first to FIG. 1, this air gun has a firing chamber 1, an operating chamber 2 and a shuttle 3, which in turn has a firing piston 4, a stem 5 and an operating piston 6. The firing piston 4 and stem 5 are a stainless steel casting. It should be noted that not only is the stem hollow, but the piston is elongate with an internal space $1_1$, forming part of the firing chamber 1 when the shuttle 3 is in its firing position as shown in FIG. 1. The rest of the firing chamber 7 is constituted by the space $1_2$ within the firing chamber body part 7. This is bolted to a port body part 8 which is in turn bolted to an operating chamber body part 9. To the remote end of this is attached a firing solenoid valve 10 and a charging pressurized-air-line connector 11. Between the body parts 8 and 9, a partition 12 is clamped. Parts 7,8,9 and partition 12 are of stainless steel. The partition 12 carries a captive nylon material bearing 13 in which the stem 5 of the shuttle 3 is a loose sliding fit such as to permit passage of water and pressurized air. The stainless steel operating piston 6 is bolted to the end of the stem 5.

An operating seal 14, conveniently an O-ring, is held in a groove at the joint between the body part 9 and the partition 12 by tapering sides of the groove. In the firing position, as shown, the operating piston 6 is held in sealing contact with the seal 14 by pressurized air in the operating chamber. Air charged via connector 11 can pass through throttle 15 in the piston 6 and stem 5 to the firing chamber 7 to charge it.

A free floating firing seal 16 in the form of a stainless steel ring 17 with O-ring seals 18,19 and a nylon material bearing 20 is free to move between a step 21 in the body part 7 and an aluminium bronze wear sleeve 22 which acts as a bearing for the firing piston 4. (It should be noted that the length of the piston 4 gives it good support in the wear sleeve 22.) O-ring seal 18 seals the seal 16 against pressurized air leakage between the ring 17 and body part 7; whilst O-ring seal 19 does so between the ring 17 and the end face of the piston 4. Although the ring 17 may solidly abut the body part 7 at the step 21 this is not necessary for operation of the seal 16. The ring 17 has damping throttles 17' spaced around itself. These by-pass the bearing 20 to allow pressurized air to pass as far as the O-ring seal 18. There is therefore a pressure force on the seal ring 17, due to pressure acting on the incremental surface area between the diameter of the O-ring 19 and the O-ring 18, urging the ring 17 into sealing engagement with the piston 4. It should be noted that the operating seal 14 has a slightly larger diameter still than the O-ring 18 whereby the net pressure force or bias on the shuttle is towards the firing chamber 1.

On firing of the gun by dumping of a small quantity of the pressurized air from the operating chamber 2 via the solenoid valve 10 to the ambient water, the air cannot flow sufficiently fast through the throttle 15 in the shuttle to make up the loss and the pressure bias on the shuttle is reversed in direction, causing the shuttle to move towards the operating chamber. The solenoid valve is only open momentarily. As soon as the shuttle begins to move the operating seal 14 is broken and the pressurized air flows around the operating piston 6 with the result that the net pressure force on the shuttle from the firing chamber is very large and the shuttle rapidly accelerates. Due to the initial pressure bias on the firing seal ring 17 it tends to follow the shuttle until stopped by the wear sleeve 22. The shuttle immediately exposes air ports 23 in the wear sleeve 22 and body part 8.

At the other end of the wear sleeve and body part 8 are water ports 24 allowing escape of water within water space 25. Towards the end of its stroke, the firing piston very nearly closes these ports 24 which then act as damping throttles, so that rise in the trapped water pressure cushions the shuttle. A similar cushioning occurs due to trapped air at the charging connector end of the operating chamber which tapers towards this end. The charging air is free to enter the gun throughout the firing process.

The net effect is for the shuttle to rebound and for re-charging of both chambers to commence. When the piston 4 meets the sealing ring 17 air trapped between the ring and the step 21 is expelled through the damping throttles 17' with the result that the shuttle is controllably brought to rest.

This gun has a firing chamber capacity of 1000 cubic inches and is designed to operate at pressures in excess of 2000 psi.

SECOND EMBODIMENT

Figure 2:
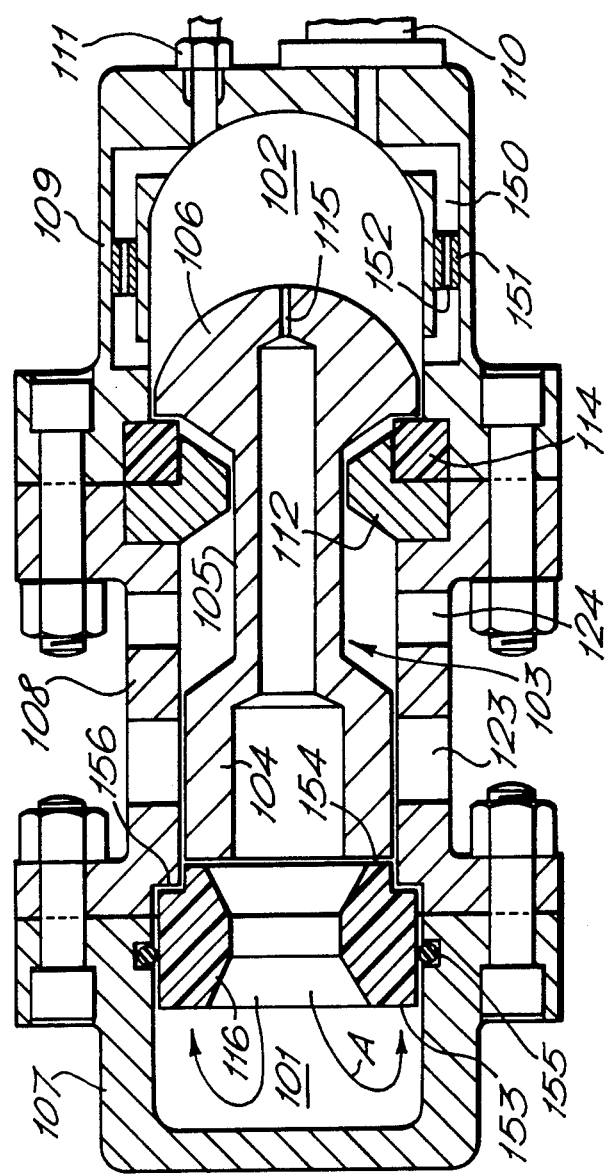
FIG. 2 is a similar transverse longitudinal cross-sectional view of a second seismic air gun of the invention.

FIG. 2 shows a second seismic air gun of the invention having a firing chamber 101, an operating chamber 102, a shuttle 103, a firing piston 104, a stem 105, an operating piston 106, body parts 107,108,109, a firing solenoid valve 110, a charging air connector 111, a partition 112, an operating seal 114, a shuttle throttle 115, a firing seal 116, air release ports 123 and water release ports 124. These parts all have the same general function as the corresponding parts in the gun of FIG. 1. However, there are differences in construction as outlined below.

Firstly the shuttle is a unitary light alloy casting, hard anodized for protection against sea water corrosion, with the operating piston 106 integral with the stem 105. No wear sleeves are provided, instead the pistons bear directly on the parts 108,109. This gives good guidance to the shuttle. Should it wear, it is cheap to replace.

Because of this bearing arrangement no partition bearing is required, the partition 112 merely acting as a baffle to prevent major ingress of water to the opposite side of the piston 106 and major egress of pressurized air flowing to this opposite side on firing. Some small flow past the baffle may occur, but this is unimportant. The baffle is split diametrically to allow assembly of the gun. The operating seal 114 is a nylon material ring and is captivated between the baffle 112 and a step in the body part 109. It is fitted by being passed over the firing piston 104 which is of smaller diameter than the operating piston 106.

The piston 106 is dome-shaped to resist stresses generated during damping and return of the shuttle. The operating chamber 102 is correspondingly shaped. To provide both operating air transfer from the operating chamber 102 to the opposite side of the operating piston 106 and damping of the shuttle after firing as it approaches the end of its stroke gas trapped in front of the shuttle is permitted to by-pass the operating piston via by-pass passages 150 in the operating chamber body part 109. These passages are provided with inserts 151 having damping throttles 152.

The other major difference from the seismic air gun of FIG. 1 is in the firing seal 116. This is in the form of a nylon material ring which is free floating. During initial charging of the firing chamber 101 swirling air flow A acts on the back face 153 of the seal ring 116 urging it into sealing engagement with the end face of the firing piston 104. Once in contact air is excluded from the front face 154 of the sealing ring 116. Thus the pressure force bias on the ring keeps it in sealing contact with the end face of the firing piston 104. To prevent leakage of air between the ring 116 and the body part 107 an O-ring 155 is provided. When the gun is fired, the sealing ring is restrained from following the shuttle by the step 156 in the body part 108.

This second seismic air gun has particular advantage in that its unitary shuttle is much stronger than compound constructions previously used and in fact used in the gun described with reference to FIG. 1.

THIRD EMBODIMENT

Figure 3:
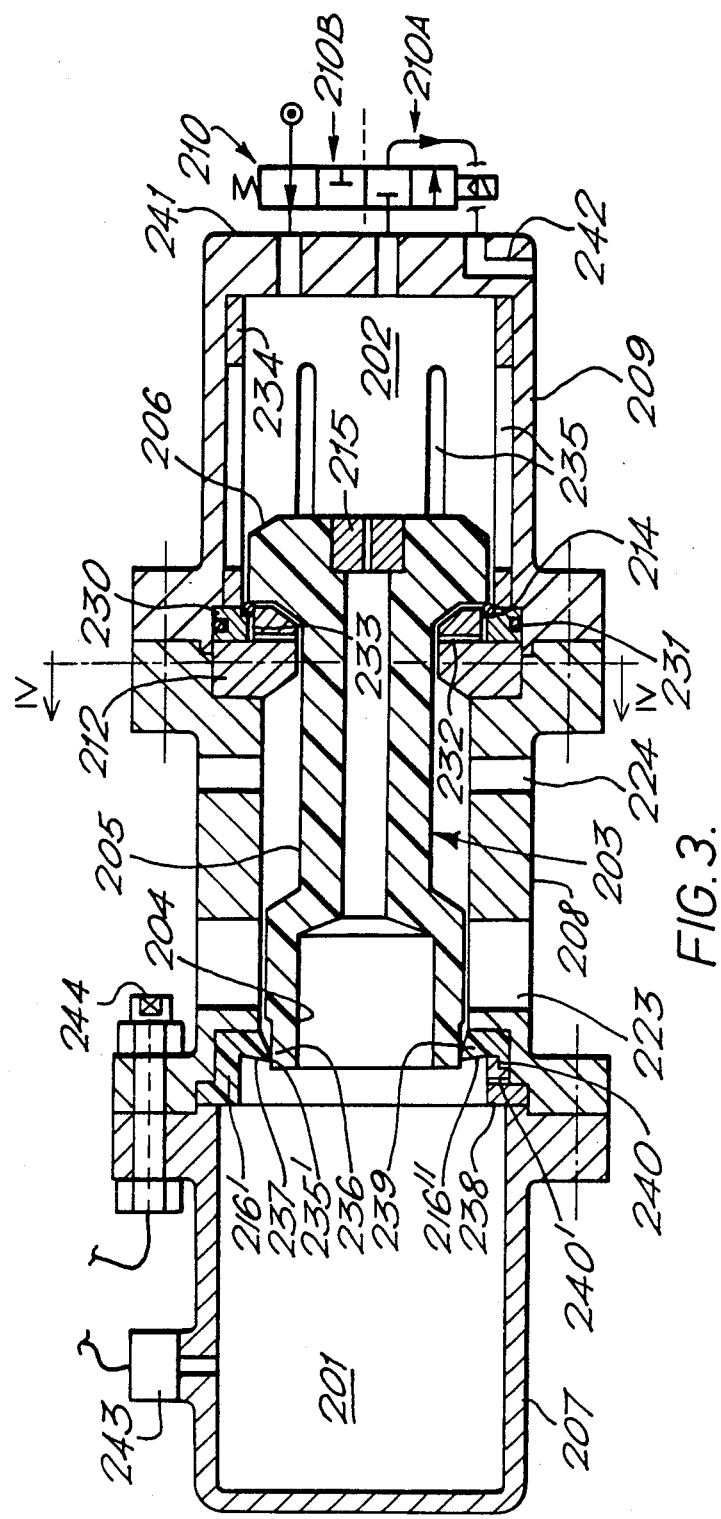
FIG. 3 is a similar transverse longitudinal cross-sectional view of a third seismic air gun of the invention.
Figure 4:
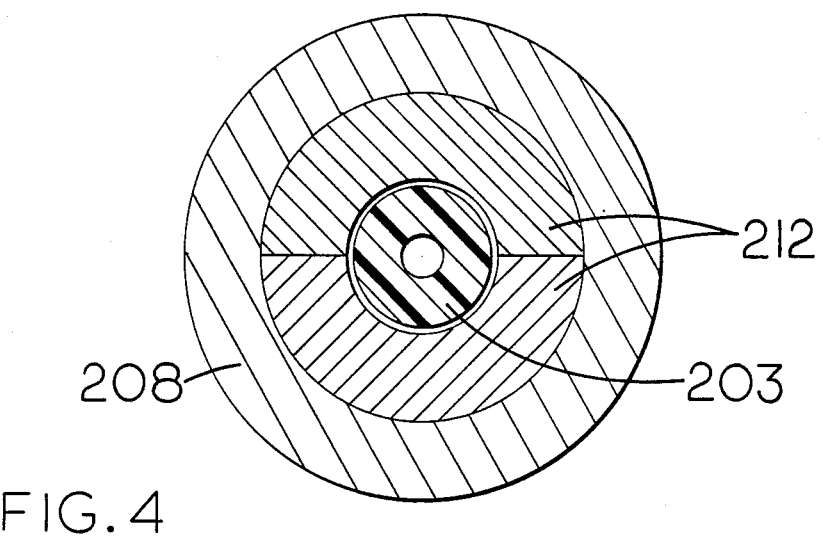
FIG. 4 is a cross-sectional view of the seismic air gun taken along line IV—IV of FIG. 3, illustrating the diametrical split in the illustrated ring.

FIG. 3 shows a third seismic air gun having a firing chamber 201, an operating chamber 202, a shuttle 203, a firing piston 204, a stem 205, an operating piston 206, body parts 207,208,209, a firing solenoid valve 210, a partition or baffle 212, an operating seal 214, a shuttle throttle 215, a firing seal 216' and 216", air release ports 223 or water release ports 224. These parts all have the same general function as the corresponding parts of the guns of FIGS. 1 and 2 and will be described below only insofar as their details differ from those of the other guns.

The shuttle 203 is of plastics material. Polyacetal materials have been found to be suitable, in particular Delrin (Trade Mark). The throttle 215 is a metallic insert in the operating piston end of the shuttle. The body parts 207,208,209 are of stainless steel.

The baffle 212 is comprised of two stainless steel collets together forming a diametrically split disc. Passage means is provided at the internal diameter of the disc by clearance between the disc and the stem 205. The disc supports a Delrin seal ring 230 itself carrying the operating seal in the form of an O-ring 214. To obviate leakage at the external diameter of the ring 230 an O-ring seal 231 is provided. Drillings 232, 233 in the collets and the ring 230 allow escape of any water and- /or gas accumulating behind the O-ring 214 during its sealing deformation. The internal diameter of the ring 230 is a clearance fit over the outside diameter of the firing piston and is fitted over it first during assembly of the gun. The collets are brought together and then assembled to the ring 230. This sub-assembly, including the O-ring seals 214,231, is then assembled with the shuttle into the central body portion 208. The subassembly is captivated by a sleeve 234 in the body part 209 when bolted on. The sleeve 234 has six slots 235 for transferring pressurized air to behind the operating piston during firing.

Two alternative firing seals are shown in FIG. 3. The upper one 216' is a unitary ring of polyurethane advantageously the hardest flexible material having a Shore A hardness of 95. The ring has a rim captivated between the body parts 207 and 208 thereby sealing them together. The seal has a tapered lip 235' into which the nose 236 of the firing piston engages. The nose 236 is of slightly stepped down diameter to obviate its wear. The internal diameter of the seal 216' is such that it seals as a result of its deformation. However, it should also be noted that its lip 235' is slightly undercut at 237 whereby the pressure on it urges it into contact with the firing piston for further assuring its sealing.

The alternative firing seal 216" is a two piece seal, incorporating a captivating member 238 having an L-shaped cross-section. One limb is captivated between the body parts 207, 208. The other limb captivates an elastomeric sealing member 239 between a step 240 in the captivating member and a rim on the body member 208. The member 238 has a series of bleeds 240' for leading pressurized air to the back of the sealing member 239, whereby the latter is urged into sealing engagement with the nose of the firing piston.

The solenoid valve 210 shown diagrammatically in FIG. 3, is a dual function valve secured by a seat 241 on the body part 209. Its section 210A dumps pressurized air from the operating chamber 202 on firing via a passage 242 in the body-part 209. The valve's section 210B cuts off charging supply of pressurized air to the operating chamber during the dumping for firing. This allows quicker firing and quicker overall firing of the gun.

Firing of the gun is detected by either two alternative piezoelectric pressure-transducing sensors 243,244. The one 243 is secured into the firing chamber body part and detects firing chamber pressure, which drops stepwise on firing. The other detector 244 is built into one of a plurality of bolts securing the body parts 207 & 208 together, though it could be in one of the bolts securing together parts 208 & 209. The detector registers the explosive increase in the pressure of the ambient water and thereby detects firing of the gun.

A general advantage of the above described seismic air guns of the invention is that in contrast to prior guns fired by transferring air across the operating piston they have a more constant fire time lag, i.e. the time from sending a fire pulse to the gun solenoid until the gun energy release.

The invention is not intended to be restricted to the details of the above described embodiments. Variations with the scope of the claims will be apparent to those skilled in the art.

We claim:

1. In a seismic air gun comprising: a body; a firing chamber within said body for containing pressurized gas to be released on firing said gun; an operating chamber within said body also for containing pressurized gas; a shuttle having a one end and an other end, said shuttle being movably accommodated in said body, and having a firing piston and an operating piston, said firing and operating pistons being inter-connected by a stem, said stem and said pistons having a throttled bore for communicating pressure from said one end of said shuttle to said other end; a firing seal at said firing chamber co-operating with said firing piston to close said firing chamber, when said shuttle is in a position for firing; an operating seal at said operating chamber co-operating with said operating piston to close said operating chamber when said shuttle is in said position for firing, said operating seal sealing a greater area of said operating piston to said body than the area of said firing piston sealed to said body for maintaining the pressure of pressurized gas in said operating chamber acting on said operating piston with a force greater than that of the pressure of the pressurized gas acting on said firing piston, a firing solenoid; a seat on said body for said firing solenoid; one passageway in said body from said operating chamber to said seat for leading pressurized gas to said firing solenoid, the improvement comprising: another passageway leading directly from said seat to an ambient opening for firing of said gun by dumping pressurized gas from said operating chamber direct to ambient surroundings, said dumped pressurized gas passing direct to ambient surroundings via said one passageway, said firing solenoid and said other passageway; and further including a baffle within said body and surrounding said stem of said shuttle, said stem passing through said baffle with clearance to provide passage means for communicating ambient pressure form outside said body to sides of both said operating seal and at least a portion of said operating piston opposite from said operating chamber or at least for allowing escape to the ambient surroundings of any pressurized gas from said operating chamber present at said portion of the opposite side of said operating piston, whereby at least substantially ambient pressure acts on the said portion of said operating piston at least until said shuttle moves.

2. A seismic air gun as claimed in claim 1 wherein said shuttle has a hollow at its firing piston and which constitutes part of said firing chamber.

3. A seismic air gun as claimed in claim 1 including a pressure transducer arranged in said body at said firing chamber for detecting firing of said gun.

4. A seismic air gun as claimed in claim 1 including a pressure transducer arranged in a bolt interconnecting two body portions, said pressure transducer being arranged and adapted to detect firing by detecting of the abrupt rise in ambient pressure resulting from firing.

5. A seismic air gun as claimed in claim 1, wherein the solenoid valve is a dual function valve, normally admitting pressurized air from a supply to said operating chamber and closing said operating chamber from the ambient surroundings and selectively isolating said operating chamber from the supply and opening said operating chamber to the ambient surroundings.

6. A seismic air gun as claimed in claim 1, wherein said other passasgeway leading directly from said solenoid to said ambient opening is incorporated in said solenoid.

7. A seismic air gun as claimed in claim 1, wherein said other passageway leading directly from said solenoid to said ambient opening is incorporated in said body.

8. A seismic air gun as claimed in claim 1, wherein said baffle member is a separate component assembly to said body and carrying said operating seal.

9. A seismic air gun as claimed in claim 8 including secondary ports for exhausting water from around said stem, which water is trapped between said firing piston and said baffle on firing of said gun.

10. A seismic air gun as claimed in claim 8 wherein said shuttle is of unitary construction and said baffle is of a two-piece construction.

11. A seismic air gun as claimed in claim 10 wherein said baffle is a diametrically split metallic disc.

12. A seismic air gun as claimed in claim 11 wherein said shuttle is of plastics material.

13. A seismic air gun as claimed in claim 11 wherein said baffle supports a one piece seal ring, having an internal diameter through which said firing piston can pass on assembly of said gun.

14. A seismic air gun as claimed in claim 13 wherein said seal ring carries an O-ring seal constituting said operating seal.

15. A seismic air gun as claimed in claim 1 wherein said firing seal is a side seal in which a nose of said firing piston is sealingly engageable circumferentially.

16. A seismic air gun as claimed in claim 15 wherein the firing seal is of flexible material and presents a taper into which said nose of said firing piston engages.

17. A seismic air gun as claimed in claim 16 including a firing-seal-captivating member incorporating a bleed for communicating the firing chamber pressure to the rear of said firing seal for movement of said firing seal towards said firing piston.

18. A seismic air gun as claimed in claim 16 wherein said firing seal is a one piece lip seal having a free internal diameter smaller than the outside diameter of said nose of said firing piston whereby sealing is at least substantially caused by compression of said firing seal.

19. A method of firing a seismic air gun comprising a body; a firing chamber within said body for containing pressurized gas to be released on firing said gun; an operating chamber within said body also for containing pressurized gas; a shuttle having a one end and an other end, said shuttle being movably accommodated in said body, and having a firing piston and an operating piston, said firing and operating pistons being interconnected by a stem, said stem and said pistons having a throttled bore for communicating pressure from said one end of said shuttle to said other end; a firing seal at said firing chamber co-operating with said firing piston to close said firing chamber, when said shuttle is in a position for firing; an operating seal at said operating chamber co-operating with said operating piston to close said operating chamber when said shuttle is in said position for firing, said operating seal sealing a greater area of said operating piston to said body than the area of said firing piston sealed to said body for maintaining the pressure of pressurized gas in said operating chamber acting on said operating piston with a force greater than that of the pressure of the pressurized gas acting on said firing piston, a firing solenoid; a seat on said body for said firing solenoid; one passageway in said body from said operating chamber to said seat for leading pressurized gas to said firing solenoid, the improvement comprising:

another passageway leading directly from said seat to an ambient opening for firing of said gun by dumping pressurized gas from said operating chamber direct to ambient surroundings, said dumped pressurized gas passing direct to ambient surroundings via said one passageway, said firing solenoid and said other passageway; and further including a baffle within said body and surrounding said stem of said shuttle, said stem passing through said baffle with clearance to provide passage means for communicating ambient pressure from outside said body to sides of both said operating seal and at least a portion of said operating piston opposite from said operating chamber or at least for allowing escape to the ambient surroundings of any pressurized gas from said operating chamber present at said portion of the opposite side of said operating piston, whereby at least substantially ambient pressure acts on the said portion of said operating piston at least until said shuttle moves; said method consisting in the steps of:

charging said operating chamber with pressurized gas;

allowing said shuttle to move to its firing position with said firing piston sealing on said firing seal and said operating piston sealing on said operating seal;

allowing said firing chamber to become charged with pressurized gas via said throttled bore in said stem; and firing said gun by dumping pressurized gas from said operating chamber to the ambient surroundings via said one passageway, said firing solenoid and said other passageway, whereby the pressure force on said firing piston overcomes the pressure force on said operating piston to move said shuttle to its release position.

* * * * *